W. H. FAHRNEY.
MOLDING APPARATUS FOR FORMING SUNKEN CONCRETE STRUCTURES.
APPLICATION FILED AUG. 3, 1908.
921,211.
Patented May 11, 1909.
4 SHEETS—SHEET 1.
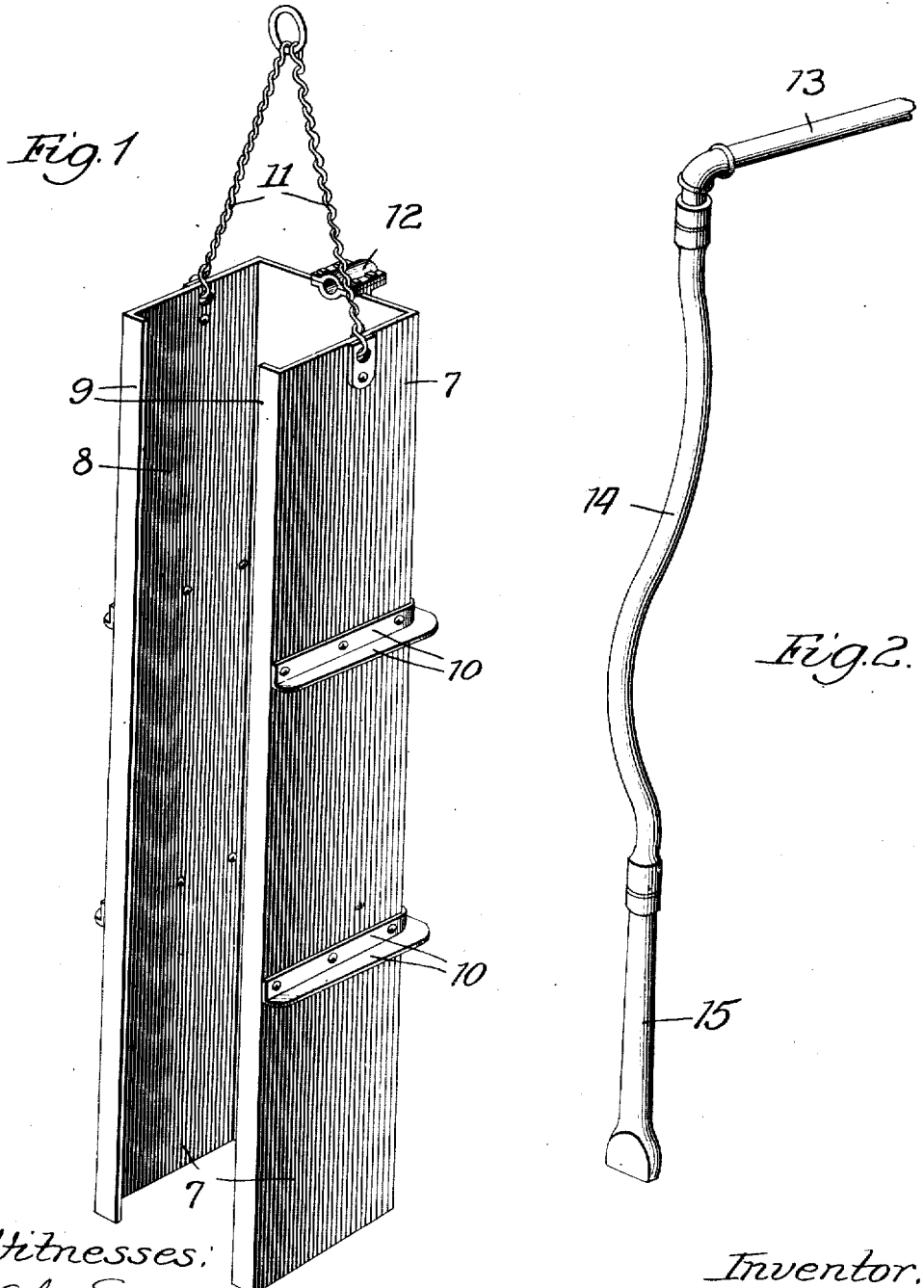

W. H. FAHRNEY.
MOLDING APPARATUS FOR FORMING SUNKEN CONCRETE STRUCTURES.
APPLICATION FILED AUG. 3, 1908.
921,211.
Patented May 11, 1909.
4 SHEETS—SHEET 2.
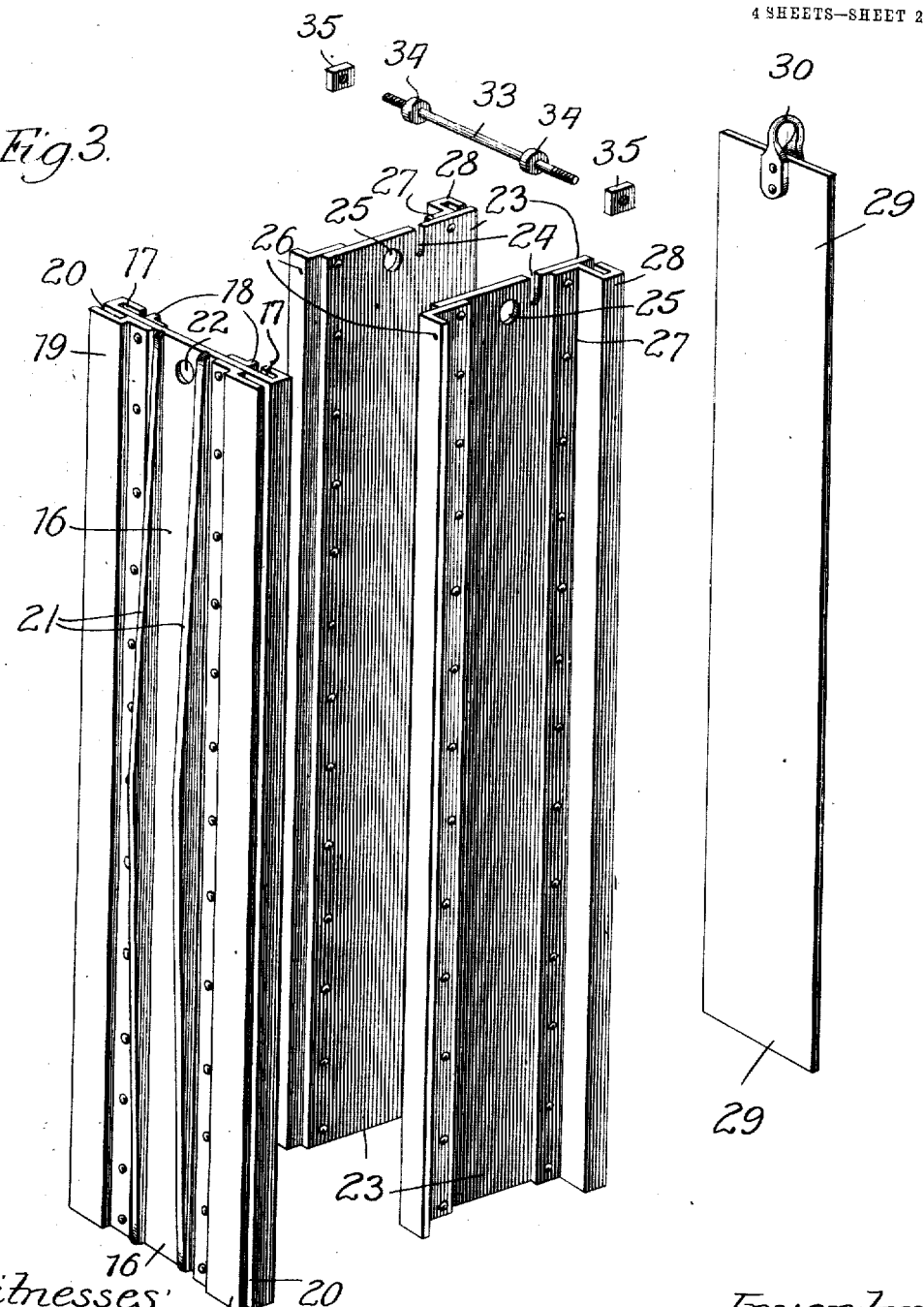

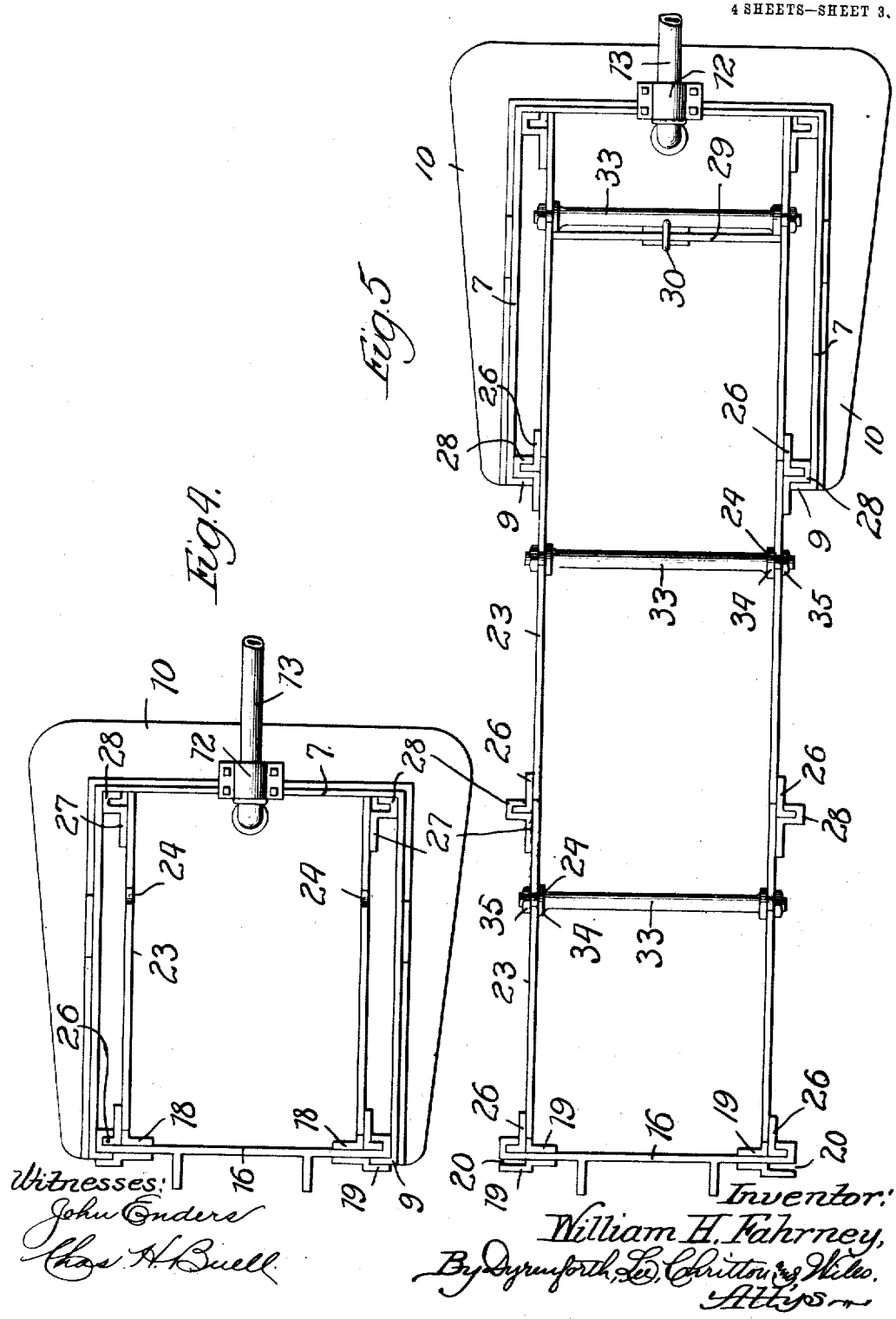

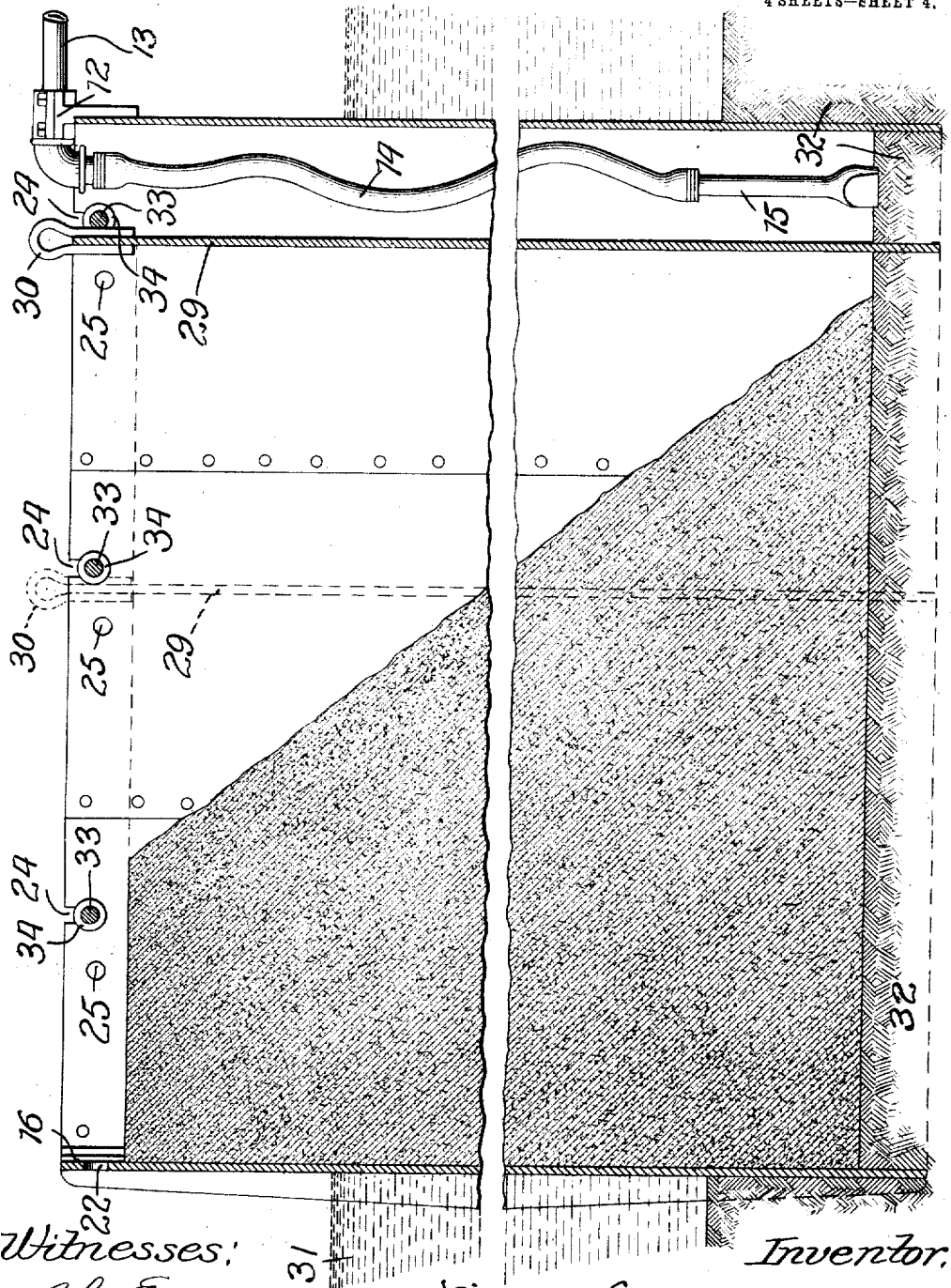

UNITED STATES PATENT OFFICE.

WILLIAM H. FAHRNEY, OF CHICAGO, ILLINOIS, ASSIGNOR OF ONE-HALF TO LINUS H. BRACE, OF EVANSTON, ILLINOIS.

MOLDING APPARATUS FOR FORMING SUNKEN CONCRETE STRUCTURES.

No. 921,211.  Specification of Letters Patent.  Patented May 11, 1909.

Application filed August 3, 1908. Serial No. 446,593.

*To all whom it may concern:*

Be it known that I, WILLIAM H. FAHRNEY, a citizen of the United States, residing at Chicago, in the county of Cook and State of Illinois, have invented a new and useful Improvement in Molding Apparatus for Constructing Sunken Concrete Structures, of which the following is a specification.

My invention relates to apparatus for use in the practice of the method of constructing sunken concrete structures forming the subject of my concurrent application for Letters Patent of the United States, Serial No. 446,594, filed on the third day of August, 1908. The method referred to involves, generally stated, the molding of sunken, and more especially submerged, concrete structures, such as sea-walls, foundations, piers and the like, in successive sections and bonding the sections together by sinking a lined mold into the bed of the body of water to be equipped with the structure, withdrawing the sand and water and replacing the same with concrete filled into the mold, thereupon withdrawing the mold-casing to be used for forming the next succeeding section of the structure but leaving the mold-lining embedded to support the concrete while it is setting, after which the sectional lining is removed to be used again in molding additional sections; and these operations are repeated until the structure is completed.

The work for which I have more especially designed my improvement is that of constructing sea-walls, so that the description hereinafter contained is confined to its use in that connection.

In the accompanying drawings, Figure 1 is a perspective view of the mold-casing; Fig. 2 is a similar, broken view of a suction-pipe and nozzle for emptying the mold of sand and water but shown detached from the casing; Fig. 3 is perspective view showing the parts of the sectional mold-lining or sheeting and the gate in their unassembled relation; Fig. 4 is a plan view showing the complete mold in the condition in which it is used for forming the initial wall-section, Fig. 5 is a similar view, in the nature of a diagram, showing the condition of the apparatus in the progress of the work, and Fig. 6 is a broken longitudinal vertical section, illustrating, by way of a diagram, the progress of the work.

The mold consists of a casing 7 of suitable shape and dimensions, provided with an opening 8 extending throughout its length in one side, the opening being between flanges 9 projecting toward each other at right-angles to the casing-sides. The casing, as shown in Fig. 1, is of rectangular cross-section and open at both ends, and is formed, by preference, of sheet-steel, being reinforced at intervals by strengthening-ribs 10 and provided with a flexible hanger 11 by which to suspend it from a crane, derrick or boom (not shown) for lowering it into place and withdrawing it. At the top of the casing is a bracket 12 for securing in position a suction-pipe 13 leading from a suction-pump (not shown) and terminating in a hose 14 carrying a nozzle 15 on its free end. A gate 16 (Figs. 3, 4 and 5), used, as hereinafter explained, for closing the open side of the casing, is formed with sockets 17 along its inner lateral edges, adjacent to each of which on the inner face of the gate extends lengthwise thereof a stop or flange 18; and on the outer face of the gate are bars 19 of Z-shape in cross-section forming guide-sockets 20 along its lateral edges. The gate is also shown to be provided on its outer face or back with strengthening-ribs 21 and it contains a hole 22 near its upper end at which to engage it for lowering and raising it through the medium of a crane, or the like. Similar side-sheets 23 for lining the casing, and of which a large number is provided for use in pairs in molding a wall-section, contain recesses or notches 24 and holes 25 at one end, and each side-sheet is provided along one outer edge with an angle-iron 26, and along its opposite edge with bars 27 terminating in socket heads 28; and a back-sheet 29 forming another lining-section is equipped on its upper end with a loop 30 by which to handle it through the medium of the aforesaid crane, or the like.

To use my improved apparatus for constructing a concrete wall in a body of water 31 (Fig. 6), the casing is placed on end in the selected position, the gate 16 is adjusted with its sockets 20 engaging the flanges 9 to close the opening 8, and the suction-pipe is caused to withdraw sand and water out of the casing and thereby sink it to the desired depth in the bed 32 of the body of water. The side-sheets 23 are thereupon introduced into the empty casing, being guided by moving the angle-bars 26 in the sockets 17, and the rear ends of the side-sheets abut against the back of the casing and are braced in its corner-portions by the socket-heads 27 fitting the same. The side-sheets are braced in position by a cross-rod 33 provided near its threaded ends with stops, shown as collars 34 to bear against the inner sides of the sheets when said ends are introduced into the notches 24, when nuts 35 are applied to them to clamp the sheets. The back-sheet 29 is then introduced into the casing between the side-sheets, being sustained by sinking it, like the other portions of the structure, into the sand-bed 32 and by bearing at its upper end against the rod 33. To then form the first section of the sea-wall to be constructed, the mold is filled, in the space between the parts 16, 23 and 29, with concrete, whereupon the casing is raised by the hanger 11 away from the sheeting, including the gate, thus leaving the same as a support for the section while the concrete is setting. Meantime the casing is lowered into position adjacent to the first-molded section, being guided into place by movement of the flanges 9 embracing the backs of the socket-heads 28 (see Fig. 5) of the sheeting still supporting the first section. The suction-pump is again actuated to empty the casing, when another pair of side-sheets 23 is placed in position, being guided into place by their angle-irons 26 entering the socket-heads 28 of the first lining-sections for interlocking the mold therewith, these side-sheets being secured by a rod 33 and another back-sheet 29 is adjusted in place in the casing to complete the mold, but with the open side 8 of the casing opposed to the back-sheet 29 at the first-molded section. Before filling the mold with concrete for the second section of the wall, the back-sheet of the first section is withdrawn, whereupon the filling with concrete takes place. In thus repeating the filling, the still green concrete of the first section may fall down from it into the mold through the opening 8 and thus effect the bonding of the first and second wall-sections and the filling with concrete is continued to the desired length in the mold and also to supply to the first section the portion that has fallen into the second section. With the second section of the wall thus formed, the casing is withdrawn and placed for molding a third section, then emptied and lined, and the back-sheet of the second section is removed for the described bonding purpose, when the mold is again filled with concrete to form the third wall-section; and these operations are repeated until the desired number of wall-sections have been molded in succession to produce the required length of wall. When the concrete of a molded section becomes set so that it will stand without support from the sheeting, the latter is withdrawn to be used with the casing in forming a fresh section; and, it will be understood, when the lining of the first-molded section is thus removed, the gate used to coöperate with it is also removed, the withdrawal being effected by applying the derrick, or the like, to the sheets, after first removing the rod 33.

In Fig. 6, which illustrates the bonding-method described, the position of the withdrawn back-sheet 29 is indicated in dotted lines.

What I claim as new and desire to secure by Letters Patent is:

1. A concrete-mold for the purpose set forth, comprising a casing open at both ends and lengthwise along one side, and a sectional lining for the casing including side-sheets and a back-sheet longitudinally insertible into the casing and from which the casing is longitudinally withdrawable, said back-sheet being adapted to form a closure for the open side of the casing in the operative position of the mold succeeding the first.

2. A concrete-mold for the purpose set forth, comprising a casing open at both ends and lengthwise along one side, and a sectional lining for the casing including side-sheets spaced from the adjacent casing-sides and a back-sheet, said sheets being longitudinally insertible into the casing which is longitudinally withdrawable from them and the back-sheet being adapted to form a closure for the open side of the casing in the operative position of the mold succeeding the first.

3. A concrete-mold for the purpose set forth, comprising a casing open at both ends and lengthwise along one side, a gate longitudinally adjustable upon the open casing-side, and a sectional lining for the casing comprising side-sheets and a back-sheet longitudinally insertible into the casing, the casing being longitudinally withdrawable from said gate and sheets and said back-sheet being adapted to form a closure for the open casing-side in the operative position of the mold succeeding the first.

4. A concrete-mold for the purpose set forth, comprising a casing open at both ends and lengthwise along one side, and a sectional lining for the casing including side-sheets and a back-sheet longitudinally insertible into the casing and from which the casing is longitudinally withdrawable, said back-sheet being adapted to form a closure for the open side of the casing in the operative position of the mold succeeding the first, and socket-heads extending along corresponding edges of the side-sheets for the locking purpose described.

5. A concrete-mold for the purpose set forth, comprising a casing open at both ends and lengthwise along one side, a sectional lining for the casing including side-sheets and a back-sheet longitudinally insertible into the casing and from which the casing is longitudinally withdrawable, said back-sheet being adapted to form a closure for the open side of the casing in the operative position of the mold succeeding the first, socket-heads extending along corresponding edges of the side-sheets for the locking-purpose described, and means for releasably bracing said side-sheets.

6. A concrete-mold adapted to be sunk at one end into the bed of a body of water to extend at its opposite end above the water-level for the purpose set forth, comprising a casing of angular cross-section open at both ends and having an open side provided with flanges, a sectional lining in said casing consisting of a back-sheet and side-sheets each provided with a socket-head along one edge and a guide-bar along its opposite edge, and a gate for closing said open side and cooperating with said side-sheets, said gate having sockets along the edge-portions of its inner face and sockets along the edge-portions of its outer face to engage said flanges.

7. A concrete-mold adapted to be sunk at one end into the bed of a body of water to extend at its opposite end above the water-level for the purpose set forth, comprising a casing open at both ends and having an open side, a sectional lining in said casing consisting of a back-sheet and side-sheets each provided with a socket-head along one edge, an angle-bar along its opposite edge and a recess in its upper end, and means for bracing said side-sheets comprising a rod provided with stops and threaded ends seating in said recesses and nuts on said threaded ends.

WILLIAM H. FAHRNEY.

In presence of—
CHAS. E. GAYLORD,
RALPH A. SCHAEFER.